(12) United States Patent
Boecking et al.

(10) Patent No.: US 11,364,538 B2
(45) Date of Patent: Jun. 21, 2022

(54) CLAMPING SYSTEM FOR FASTENING A COOLING UNIT TO AN ENCIRCLING SUPPORTING ELEMENT OF A CATERPILLAR-TYPE CASTING MACHINE, AND METHOD FOR FASTENING/RELEASING A COOLING UNIT TO/FROM AN ENCIRCLING SUPPORTING ELEMENT OF A CATERPILLAR-TYPE CASTING MACHINE

(71) Applicant: SMS Group GmbH, Duesseldorf (DE)

(72) Inventors: Sebastian Boecking, Siegen (DE); Guido Fick, Kreuztal (DE)

(73) Assignee: SMS GROUP GMBH, Duesseldorf (DE)

( * ) Notice: Subject to any disclaimer, the term of this patent is extended or adjusted under 35 U.S.C. 154(b) by 288 days.

(21) Appl. No.: 16/464,396

(22) PCT Filed: Nov. 24, 2017

(86) PCT No.: PCT/EP2017/080333
§ 371 (c)(1),
(2) Date: May 28, 2019

(87) PCT Pub. No.: WO2018/099815
PCT Pub. Date: Jun. 7, 2018

(65) Prior Publication Data
US 2021/0114086 A1    Apr. 22, 2021

(30) Foreign Application Priority Data
Nov. 29, 2016   (DE) .................. 102016223719.5

(51) Int. Cl.
*F16B 5/00* (2006.01)
*F16B 5/06* (2006.01)
*B22D 11/06* (2006.01)

(52) U.S. Cl.
CPC ...... *B22D 11/0608* (2013.01); *B22D 11/0677* (2013.01); *F16B 5/00* (2013.01);
(Continued)

(58) Field of Classification Search
CPC ............ B22D 11/0608; B22D 11/0677; B22D 11/0657; B22D 11/0688; F16B 5/00;
(Continued)

(56) References Cited

U.S. PATENT DOCUMENTS 1,593,555 A    7/1926  Albright
3,777,436 A *  12/1973 Bode, Jr. .............. B22D 11/041
                                              403/321

(Continued)

FOREIGN PATENT DOCUMENTS

CN       1856898 A    11/2006
CN     101878077 A    11/2010
(Continued)

OTHER PUBLICATIONS

Search Report received for the Chinese Patent Application No. 201780084701.X, dated Jul. 30, 2020, 3 pages.
(Continued)

*Primary Examiner* — Matthew P Travers
(74) *Attorney, Agent, or Firm* — Abelman, Frayne & Schwab (57) ABSTRACT

A clamping system for fastening a cooling unit on a circulating supporting element of a caterpillar-type casting machine includes at least one connecting element, which is pre-tensioned in its longitudinal direction by a spring, and a clamping arrangement, by which the cooling unit is fastenable on the supporting element. The connecting element is accommodated in a displaceably mounted manner in the direction of its longitudinal axis inside the supporting element. The clamping arrangement is formed by a head on an (Continued)

upper end face of the connecting element and a recess, which is provided on/in the cooling unit and is brought into interaction therewith. The connecting element is pre-tensioned by the spring toward the supporting element and is transferred into a clamping position, in which the cooling unit, when the head of the connecting element engages with the recess provided on/in the cooling unit, is automatically clamped with the supporting element.

13 Claims, 4 Drawing Sheets

(52) U.S. Cl.
CPC ........ *F16B 5/0642* (2013.01); *B22D 11/0657* (2013.01); *B22D 11/0688* (2013.01); *F16B 5/0657* (2013.01)

(58) Field of Classification Search
CPC ........ F16B 5/02; F16B 5/0266; F16B 5/0642; F16B 5/065; F16B 5/0657
See application file for complete search history.

(56) References Cited

U.S. PATENT DOCUMENTS

| | | | |
|---|---|---|---|
| 4,784,210 A | | 11/1988 | Takahashi et al. |
| 4,983,028 A | | 1/1991 | Derenne et al. |
| 5,311,923 A | * | 5/1994 | Cobes ................ B22D 11/0608 |
| | | | 164/430 |
| 5,979,539 A | | 11/1999 | Luginbuehl |
| 7,614,441 B2 | | 11/2009 | Lauener et al. |
| 10,758,970 B2 | * | 9/2020 | Bocking ............ B22D 11/0608 |

FOREIGN PATENT DOCUMENTS

| | | |
|---|---|---|
| EP | 0229278 A1 | 7/1987 |
| EP | 2514565 A1 | 10/2012 |
| JP | 6192762 A | 5/1986 |

OTHER PUBLICATIONS

Office Action received for the Chinese Patent Application No. 201780084701.X, dated Aug. 7, 2020, 13 pages (5 pages of Original Copy and 8 pages of English Translation).

* cited by examiner

CLAMPING SYSTEM FOR FASTENING A COOLING UNIT TO AN ENCIRCLING SUPPORTING ELEMENT OF A CATERPILLAR-TYPE CASTING MACHINE, AND METHOD FOR FASTENING/RELEASING A COOLING UNIT TO/FROM AN ENCIRCLING SUPPORTING ELEMENT OF A CATERPILLAR-TYPE CASTING MACHINE

FIELD OF INVENTION

The invention relates to a clamping system and method for fastening a cooling unit to a circulating supporting element of a caterpillar-type casting machine, and a method for releasing a cooling unit from a circulating supporting element of a caterpillar-type casting machine.

BACKGROUND OF INVENTION

According to the prior art, horizontal block casting machines, which function in the manner of a circulating caterpillar-type casting machine, are known in particular for producing aluminum alloys. Such a casting machine is known, for example, from EP 1 704 005 B1. In this case, the cooling elements of the casting machine on the linear sections or strands of casting caterpillar tracks arranged opposite to one another form the wall of a moving casting mold. The casting caterpillar tracks each consist of a plurality of endless cooling units connected to one another, which are transported along the circulating paths of the caterpillar tracks. For this purpose, blocks consisting of block elements, which are spring-fastened on frames, are placed on chains. In this case, the frames having the blocks are held by means of stationary magnets there on the chains, where they would otherwise fall down because of gravity. The chain links are provided at the connecting points thereof with rollers, which roll on guide paths. The use of permanent magnets for holding the cooling units on the supporting elements is subject to the disadvantage of complex handling if the cooling units have to be released from the supporting elements, for example, for maintenance purposes or the like.

It is also known from EP 1 704 005 B1 that electromagnets are used as an alternative to the permanent magnets to draw the cooling units in the direction of the supporting elements and/or a circulating path of a horizontal block casting machine and hold them thereon accordingly. The use of such electromagnets is subject to the disadvantage that the cooling units fall off as soon the power supply is interrupted.

A further block casting machine in which a moving mold is formed between circulating caterpillar tracks arranged opposite to one another, is known from WO 95/27145. A generic clamping system according to the preamble of claim 1 is shown therein, in which a connecting element, which is pre-tensioned in its longitudinal direction by a spring, and clamping means, by which a cooling unit can be fastened on a supporting element, are provided. Specifically, a plurality of spring-pretensioned pin elements are introduced into each cooling unit. The clamping means are each provided on an associated supporting element and are formed in the form of a pivotable claw. The free ends of the pin elements are grasped by pivoting of the claws, whereby the clamping of a cooling unit with a supporting element takes place. This fastening mechanism according to WO 95/27145 is mechanically complex, and is subject to the further disadvantage that the pin elements, which protrude out of the cooling units, can be damaged, in particular if the cooling units are removed from the supporting elements and stored, for example, in a temporary store.

SUMMARY

The invention is accordingly based on the object of providing a clamping system and a corresponding method, using which fastening and releasing a cooling unit to/from a circulating supporting element of a caterpillar-type casting machine is optimized in a simple manner and in particular functions without continuous energy supply from the outside.

This object is achieved by a clamping system and method as defined by the claims.

A clamping system according to the present invention is used to fasten or clamp a cooling unit on a circulating supporting element of a caterpillar-type casting machine, and comprises at least one connecting element, which is pre-tensioned in its longitudinal direction by a spring, and clamping means, by which the cooling unit can be fastened on the supporting element. The connecting element is accommodated in a displaceably mounted manner in the direction of its longitudinal axis inside the supporting element. The clamping means are formed by a head provided on an upper end face of the connecting element and a recess which can be brought into interaction therewith, and which is provided on or in the cooling unit. The connecting element is pre-tensioned toward the supporting element by means of the spring and is thus transferred into a clamping position. In this clamping position, the cooling unit is automatically clamped with the supporting element when the head of the connecting element is engaged with the recess provided on or in the cooling unit.

In the same manner, the invention provides a method for fastening a cooling unit on a circulating supporting element of a caterpillar-type casting machine, wherein the cooling unit is fastened on the supporting element by at least one connecting element, which is pre-tensioned in its longitudinal direction by a spring. The method provides for this purpose that a head provided on an upper end face of the connecting element is brought into engagement with a recess, which is provided on or in the cooling unit. For this purpose, the connecting element is pre-tensioned toward the supporting element by means of the spring and is thus transferred into a clamping position, in which the cooling unit is automatically clamped with the supporting element when the head of the connecting element is engaged with the recess provided on or in the cooling unit.

The invention is based on the essential finding that fastening a cooling unit on a circulating supporting element of a caterpillar-type casting machine functions in a mechanically simple manner in that the longitudinal connecting element, when it said is engaged with the recess provided on or in the cooling unit, is transferred independently or "automatically" by the spring pre-tension in the direction of its longitudinal axis into the clamping position, and thus clamping of the cooling unit with the supporting element takes place. In this manner, the clamping system is robust and failsafe. It is also advantageous for this purpose that the connecting element, together with the spring for ensuring said spring pre-tension, is not arranged on or in the cooling unit, so that handling of removed cooling units, for example, for maintenance purposes or the like, is substantially simplified and the risk of damage to protruding pin elements is thus also avoided.

In one advantageous refinement of the invention, the recess on or in the cooling unit has a lateral opening. This lateral opening is used for the purpose of the head of the connecting element being able to be introduced through it into the recess when the cooling unit is installed on the supporting element, before the clamping of the connecting element takes place. In the same manner, the head of the connecting element can also be guided back out of the lateral opening of the recess when the pre-tension of the connecting element is canceled out, for the purpose of removing the cooling unit from the supporting element.

In an advantageous refinement of the invention, at least one auxiliary plate, in which the recess is formed, is attached to the cooling unit, specifically on a side opposite to the supporting element. This results in the advantage that the body of the cooling unit as such remains unchanged and therefore its cooling capacity is also not reduced. The recess can expediently also be designed in the form of a dovetail groove, wherein the head of the connecting element is formed complementary to this dovetail groove. Such a shaping of the recess—and the head of the connecting element complementary thereto ensures space-saving clamping of the head with the recess in a simple and mechanically robust manner, and in the same manner also release of the head without jamming from the recess, if the pre-tension of the connecting element is canceled out and thus removal of the cooling unit from the supporting element is possible.

In an advantageous refinement of the invention, a depression, which is cylindrical in particular, can be formed inside the supporting element, and in said depression the connecting element is displaceably mounted in the direction of its longitudinal axis and is accommodated together with the spring. As already explained above, the accommodation or mounting of the connecting element inside the supporting element results in the advantage that the cooling unit per se is not impaired with respect to its cooling capacity. The advantage also accompanies this that the cooling unit (because the connecting element is not accommodated mounted thereon or therein) may be mounted more easily and without risk of damage if the cooling unit is removed, for example, for maintenance purposes, from the caterpillar-type casting machine.

In an advantageous refinement of the invention, a release unit can be provided on or in the supporting element, by means of which the connecting element is movable against its spring pre-tension into a release position. In this release position, clearance results between the head of the connecting element and the recess, so that the cooling unit can be removed from the supporting element. In the course of such a removal of the supporting element, the head of the connecting element is then also lifted or moved out of the recess which is provided on or in the cooling unit, for the purpose of a separation of the cooling unit from the supporting element.

Said release unit can function solely mechanically, wherein an auxiliary element is brought into contact with a base section on a lower end face of the connecting element to thus transfer the connecting element into its release position. For example, the auxiliary element is formed by a screw, which is screwed into the body of the supporting element and can be moved against the lower end face of the connecting element. In this way, as explained, the connecting element is moved in the direction of its longitudinal axis against the pre-tension of the spring to achieve the required clearance between the head of the connecting element and the recess, and thus enable a removal of the cooling unit from the supporting element.

According to an alternative embodiment of the release unit, it can function fluidically. In this case, a plate, which presses to form a seal against an inner circumferential face of the depression which is formed inside the supporting element, is attached on a lower end face of the connecting element, which is opposite to the head of the connecting element. On the side of the plate which is opposite to the connecting element, a fluid can be introduced into the depression. As a result thereof, the connecting element is moved into its release position, against the spring pre-tension and in its longitudinal direction. The connecting element is thus used inside the depression as a piston, which is moved against the spring pre-tension into the release position by the application of fluid on the side of the plate which is opposite to the connecting element.

The above-mentioned release unit, which functions fluidically in particular, advantageously enables a (partially) automatic replacement of the cooling units in a caterpillar-type casting machine. A fluid is only introduced into the depressions on the side of the plate which is attached to the lower end face of the connecting element when a removal of the cooling units from the associated supporting elements of the caterpillar-type casting machine is required, which then, as explained, cancels out the clamping between the head of the connecting element and the recess and causes a clearance to result there—for the purpose of a removal of the cooling unit from the supporting element. After the installation of a new or replacement cooling unit, the pressure application using fluid is ended, so that then the connecting element is transferred independently back into its clamping position thanks to the spring pre-tension, and this results in clamping of the cooling unit with the supporting element.

The invention accordingly also provides a method for releasing a cooling unit from a circulating supporting element of a caterpillar-type casting machine, wherein the cooling unit is clamped to the supporting element in a starting or clamping position by at least one connecting element, which is pre-tensioned in its longitudinal direction by a spring, by a head provided on an upper end face of the connecting element being engaged with a recess provided on or in the cooling unit. To carry out this method for releasing the cooling unit, a fluid under pressure is applied to a lower end face of the connecting element, whereby the connecting element is moved against the spring pre-tension into a release position, in which clearance results between the head of the connecting element and the recess provided on or in the cooling unit. Thanks to this clearance, it is subsequently possible to remove the cooling unit from the supporting element and release it accordingly.

In an advantageous refinement of the invention, a central fluid duct can be provided in the supporting element, and has a fluidic connection to an end face of the depression, within which the connecting element is accommodated in a displaceably mounted manner. If a removal of the cooling unit from the supporting element is required and/or desired, a fluid under pressure is introduced into the central fluid duct, so that the connecting element, in the function of a piston, is then transferred into the release position against its spring pre-tension.

In an advantageous refinement of the invention, a quick-action coupling can be provided for the central fluid duct, in particular on a lateral face of the supporting element, by which the fluid duct can be connected to an external fluid supply if a removal of the cooling unit from the supporting element is required. This means that the central fluid duct is always only connected to the external fluid supplied by means of the quick-action coupling if a removal of the cooling unit from the supporting element and/or the caterpillar-type casting machine is to take place. Vice versa, this also means that in normal operation of the caterpillar-type casting machine, when the cooling unit is clamped on the supporting element by means of the connecting element as explained, the central fluid duct is not connected to the external fluid supply.

By means of the present invention, a clamping system which is simple to use is provided for a caterpillar-type casting machine, using which cooling units are held or clamped on associated supporting elements in a failsafe manner and in particular without continuous energy supply from the outside, and using which a removal of the cooling, units for maintenance purposes can also be carried out easily.

BRIEF DESCRIPTION OF THE DRAWINGS

A preferred embodiment of the invention is described in detail hereafter on the basis of a schematically simplified drawing. In the figures.

DETAILED DESCRIPTION

A preferred embodiment of a clamping system 10 according to the invention is explained hereafter with reference to FIGS. 1 to 6, which is used for fastening a cooling unit 12 on a circulating supporting element 13 of a caterpillar-type casting machine 14. Identical features in the drawing are each provided with identical reference signs. It is separately noted at this point that the drawing is merely simplified and in particular is illustrated without scale. It is also provided in this clamping system 10 that the clamping of a cooling unit 12, when it is fastened on a supporting element 13, can be canceled again in a simple manner for the purpose of removal of the cooling unit 12 from the caterpillar-type casting machine 14, as also separately explained hereafter.

Figure 1:
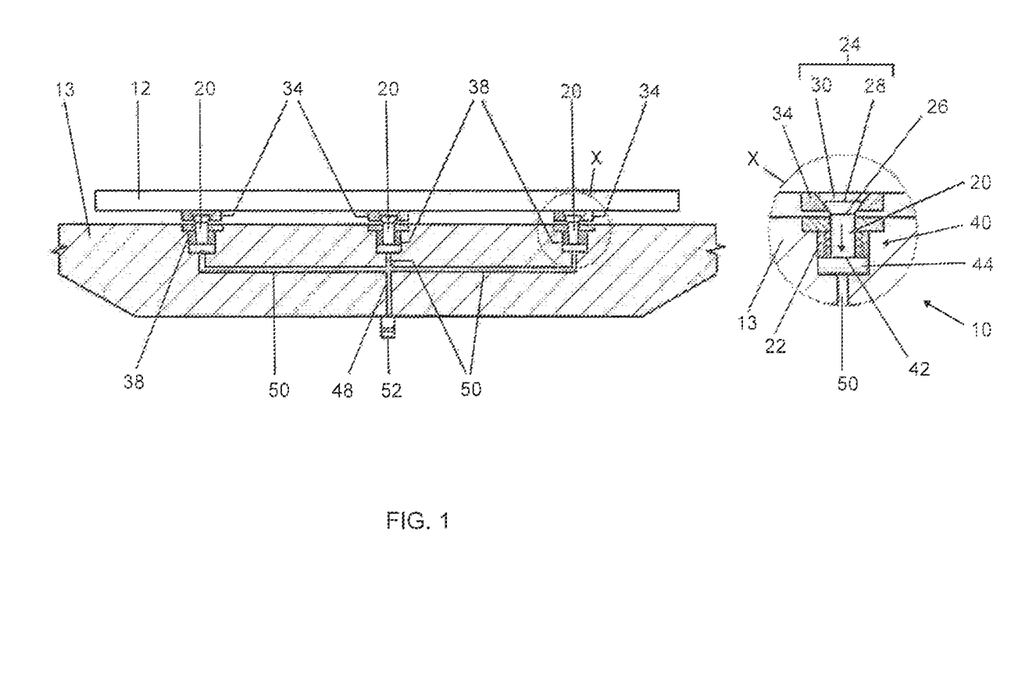
FIG. 1 shows a side view of a cooling unit and a supporting element of a caterpillar-type casting machine in conjunction with a clamping system according to the invention, in a clamping position, when a cooling unit is clamped on an associated supporting element of a caterpillar-type casting machine.
Figure 2:
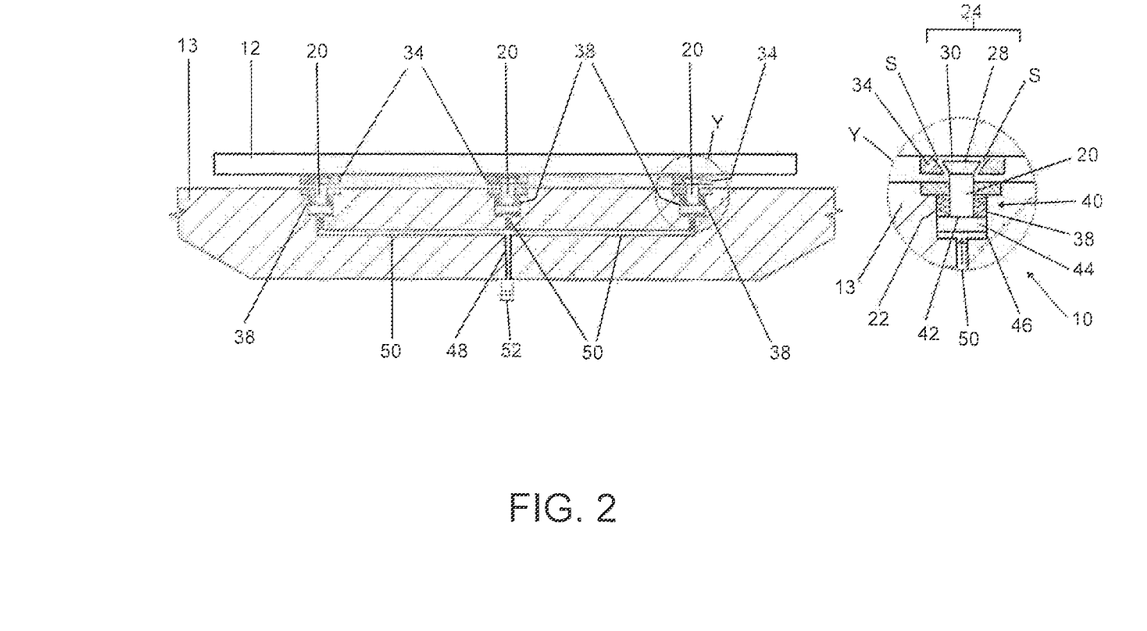
FIG. 2 shows the clamping system of FIG. 1 in a release position, in which the clamping between the cooling unit and the supporting element is canceled.

FIGS. 1 and 2 each show a side view of a cooling unit 12 and an associated supporting element 13 of a caterpillar-type casting machine 14, wherein a clamping system 10 according to the present invention is used. The clamping system 10 comprises a connecting element 20, which is pre-tensioned in its longitudinal direction by means of a spring 22. The connecting element 20 can be designed in the form of an oblong pin. Furthermore, the clamping system 10 comprises clamping means 24, by which the cooling unit 12 can be fastened on the supporting element 13. In detail, the clamping means 24 are formed by a head provided on an upper end face 26 of the connecting element 20 and a recess 30 which can be brought into interaction therewith, which is provided on or in the cooling unit 12. The functionality of the clamping system 10 is also explained in detail hereafter.

The regions X and Y of FIG. 1 and FIG. 2 are each additionally illustrated enlarged in the respective rate image region. It is apparent therefrom that an auxiliary plate 34, in which the recess 30 is formed, is attached on a lower side of the cooling unit 12, i.e., on a side opposite to the supporting element 13. The recess 30 is designed in the form of a groove 36 (for example, as a dovetail groove as shown in FIG. 3), wherein the head 28 of the connecting element 20 is shaped complementary thereto.

Figure 3:
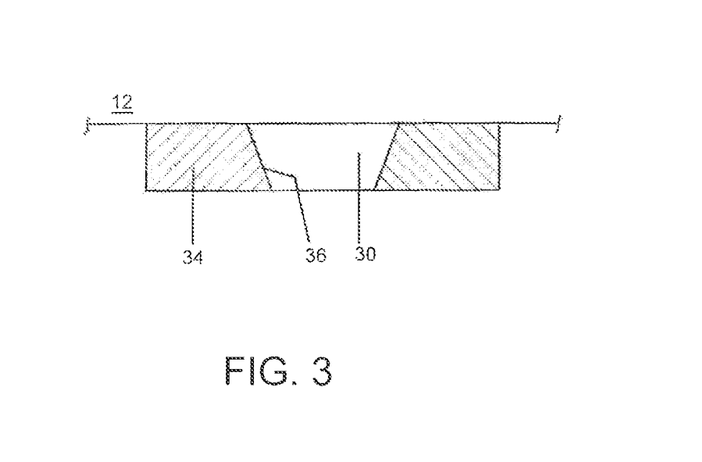
FIG. 3 shows an auxiliary plate attached to a cooling unit in a sectional view.
Figure 4:
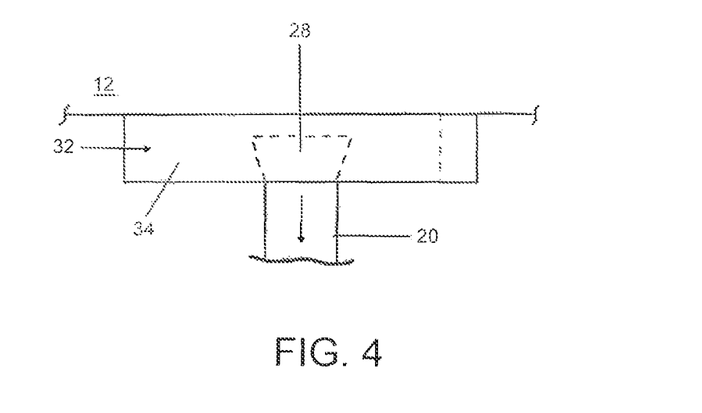
FIG. 4 shows a view of the auxillary plate of FIG. 4 from the operating side.

The auxiliary plate 34 is shown in a sectional illustration in FIG. 3. Said shaping of the groove 36 is apparent therefrom. FIG. 4 shows the auxiliary plate 34 in a view from the operating side, and illustrates a lateral opening 32, which is provided in the auxiliary plate 34 and leads into the recess 30.

Inside the supporting element 13, a depression 38, which is cylindrical in particular, is formed, and in said depression the connecting element 20, together with the spring 22, is accommodated in a displaceably mounted manner axially, i.e., in the direction of its longitudinal axis. In this case, the pre-tension of the spring 22 acts in such a way that the connecting element 20 is moved into a clamping position, which is also explained separately hereafter, in the direction of the supporting element 13. i.e., into the depression 38.

A release unit 40 of the clamping system 10 is integrated inside the supporting element 13. Specifically, a plate 44, which presses to form a seal with its circumference against an inner circumferential surface 46 of the depression 38, is attached on a lower end face 42 (cf. FIG. 2) of the connecting element 20. A fluid duct 50, through which a fluid under pressure can be introduced into the depression 38, specifically into an end face of the depression 38 adjoining the plate 44, opens into an end face of the depression 38 opposite to the plate 44.

The views of FIG. 1 and FIG. 2 illustrate that a total of three auxiliary plates 34 are attached on a lower side of a cooling unit 12. Accordingly, a total of three depressions 38 are also formed in the associated supporting element 13, each having pin elements 20 accommodated in a displaceably mounted manner therein. Notwithstanding these illustrations, it is apparent in the clamping system 10 according to the invention, more or fewer than three auxiliary plates 34 (having recesses 30) and associated pin elements 20 can also be provided over the width of a cooling unit 12 or a supporting element 13, respectively. Notwithstanding the number of the depressions 38, which are formed inside the supporting element 13, it can also be noted that the fluid ducts 50, which lead into the respective depressions 38, open into a central fluid duct 48, which can be equipped with a quick-action coupling 52 in particular on a lateral face of the supporting element 13. It is possible by means of the quick-action coupling 52 to connect the central fluid duct 48, and thus also the individual fluid ducts 50, to an external fluid supply, in order—if needed—to move the connecting element 20 against its spring pre-tension and thus lift it out of the depression 38.

Figure 5:
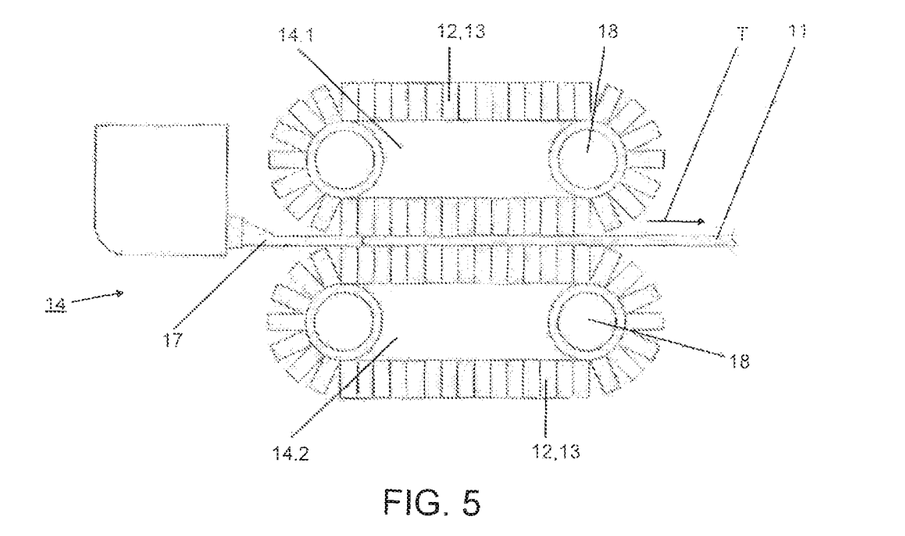
FIG. 5 shows a view of a caterpillar-type casting machine from the operating side, wherein a clamping system of FIG. 1 is used.
Figure 6:
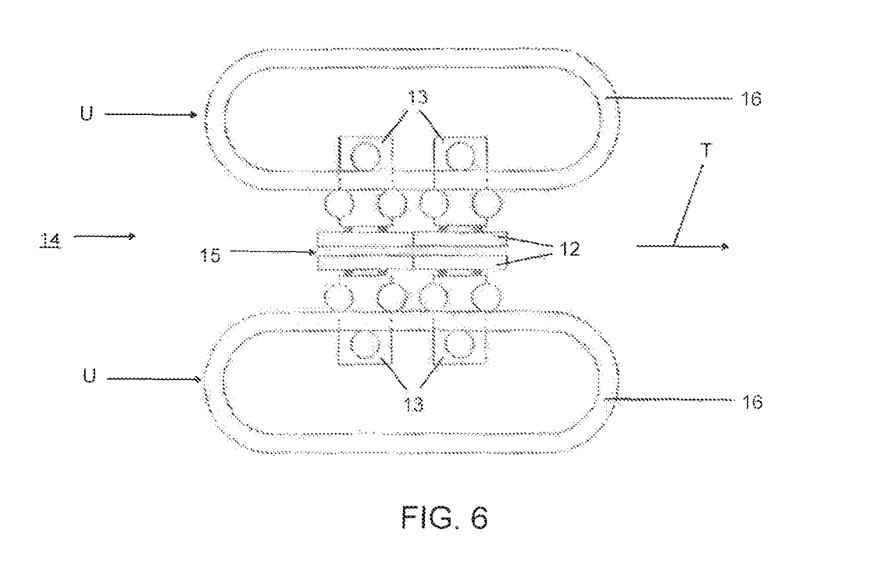
FIG. 6 shows a side view of two endless circulating paths arranged diametrically opposite of the caterpillar-type casting machine of FIG. 5.

FIG. 5 shows a simplified view from the operating side of a caterpillar-type casting machine 14, in which the clamping system 10 according to the invention is used. The caterpillar-type casting machine 14 has an upper caterpillar truck 14.1 and a lower caterpillar track 14.2, which are each formed from a plurality of supporting elements 13 and cooling units 12 fastened thereon. FIG. 6 shows a side view of two guide rails 16, using which two endless circulating paths arranged diametrically opposite are formed for the caterpillar-type casting machine 14 of FIG. 5. In this case, a plurality of supporting elements 13 having cooling units 12 attached thereon are guided along each guide rail 16, in such a way that a continuous chain of supporting elements 13 is formed, which are conveyed or transported in the transportation direction T along the guide rails 16. To illustrate the functionality of the caterpillar-type casting machine 14, only two supporting elements 13 having cooling units 12 attached thereon are shown on each of the two guide rails 16 in FIG. 6 for simplification.

FIG. 6 furthermore illustrates that a casting mold 15 is formed between the cooling units 12, which reach opposing positions in the linear sections of the circulating path U of the guide rails 16. In consideration of the transportation direction T of the supporting elements 13 along the guide rails 16, this casting mold 15 is a moving casting mold. A cast product 11 is produced by pouring liquid metal into the moving casting mold 15 through a nozzle 17 (cf. FIG. 5).

The invention functions as follows.

During an installation of a cooling unit 12 on a supporting element 13, firstly the head 28 of the connecting element 20 is introduced into the recess 30, preferably through its lateral opening 32. During this installation, the spring pre-tension of the connecting element 20 is counteracted, preferably by introducing fluid into the depression 38 through the fluid duct 50, as is indicated by an arrow in the enlarged region Y of FIG. 2. If the pre-tension of the spring 22 is subsequently not opposed with a counterforce, the connecting element 20, as indicated by the arrow in the enlarged region X of FIG. 1, is automatically transferred downward into a clamping position, in which the head 28 of the connecting element 20 engages with the groove 36 of the recess 30 and thus clamps. In this manner, the cooling unit 12 is fastened on the supporting element 30 or clamped thereto.

FIG. 1 illustrates the mentioned clamping position for the pin elements 20 when—as just explained—the cooling unit 12 is clamped to the supporting element 13.

A release of the clamping system 10, and thus a removal of the cooling unit 12 from the supporting element 13, can take place in that the central fluid duct 48 is connected to an external fluid supply by means of the quick-action coupling 52, wherein fluid is then introduced under pressure into the respective depressions 38. In this case, the fluid then presses from below against the plate 44 attached to the connecting element 20. As a result thereof, the connecting element 20, in the function of a piston, is pressed upward inside the depression 38, so that a clearance results between the head 28 of the connecting element and the associated recess 30 inside the auxiliary plate 34. This clearance is identified with the arrow "S" in the enlarged region Y of FIG. 2, and subsequently enables a release of the auxiliary plate 34 from the head 28 of the pin element 20, and a corresponding removal of the cooling unit 12 from the supporting element 13.

A further advantage of the clamping system 10 according to the invention is that after a removal of a cooling unit 12 from a supporting element 13, for example, for maintenance or repair purposes, the connecting element 20, because of the pre-tension of the spring 20, is moved far enough into the depression 38 that the head 28 of the connecting element 20 is seated at the upper edge of the depression 38. This has the result that the connecting element 20 then does not protrude far out of the depression 38 and is thus protected against unintentional damage. A further installation of a cooling unit 12 on the supporting element 13 is enabled in a simple manner in that—as explained—a fluid under pressure is applied to the depression 38 and the connecting element 20 is thus moved upward out of the depression 38.

Finally, it can be noted once again at this point that in normal operation of the caterpillar-type casting machine 14, a pressure supply with fluid is not required, and accordingly an external fluid supply is also not connected to the quick-action coupling 52. Rather, the clamping of a cooling unit 12 to an associated supporting element 13 functions solely passively and in particular electrically independently, namely solely by way of the explained pre-tension of the connecting element 20 by means of the spring 22 in the direction of the supporting element 13, whereby the head 28 of the connecting element 20 is engaged and clamped with the recess 30 inside the auxiliary plate 34.

LIST OF REFERENCE NUMERALS 10 clamping system
11 cast product
12 cooling unit
13 supporting element
14 caterpillar-type casting machine
14.1 upper caterpillar track
14.2 lower caterpillar track
15 casting mold
16 guide rail
17 nozzle
18 drive wheel
20 connecting element
22 spring
24 clamping means
26 upper end face (of the connecting element 20)
28 head (of the connecting element 20, on its upper end face 26)
30 recess (on or in the cooling unit 12)
32 lateral opening (of the recess 30
34 auxiliary plate
36 groove
38 (in particular cylindrical) depression inside the supporting element 13
40 release unit
42 lower end face (of the connecting element 20)
44 plate (attached on lower end face 42 of the connecting element 20)
46 inner circumferential surface (of the depression 38)
40 central fluid duct
50 fluid ducts
52 quick-action coupling
S clearance (between head 28 of the connecting element 20 and the recess 30)
T transportation direction (of a supporting element 13 along the guide rail 16)
U circulating path (of a guide rail 16)

What is claimed is:

1. A clamping system for fastening a cooling unit on a circulating supporting element of a caterpillar-type casting machine, the system comprising:
   the cooling unit and the circulating supporting element, wherein a depression is formed inside the supporting element,
   at least one connecting element having a longitudinal axis and which is pre-tensioned in a longitudinal direction by a spring, the connecting element being displaceably mounted in said depression in a direction of the longitudinal axis of the connecting element and accommodated together with the spring, and clamping means, by which the cooling unit is fastenable on the supporting element, and the clamping means is formed by a head provided on an upper end face of the connecting element and a recess, which is provided on or in the cooling unit and can be brought into interaction with the head, wherein the connecting element is pre-tensioned by the spring toward the supporting element and is thus transferred into a clamping position, in which the cooling unit, when the head of the connecting element is engaged with the recess provided on or in the cooling unit, is automatically clamped with the supporting element; and wherein a release unit is provided on or in the supporting element, the release unit enabling the connecting element to move against the spring pre-tension into a release position, in which a clearance results between the head of the connecting element and a surface forming the recess provided on or in the cooling unit, so that the cooling unit is removable from the supporting element.

2. The clamping system of claim 1, wherein the recess has a lateral opening, wherein the head of the connecting element can be introduced through the lateral opening into the recess.

3. The clamping system of claim 1, wherein at least one auxiliary plate, in which the recess is formed, is attached on the cooling unit on a side opposite to the supporting element.

4. The clamping system of claim 1, wherein the recess is a groove, wherein the head of the connecting element is shaped complementary to the groove.

5. The clamping system of claim 1, wherein the release unit functions mechanically, wherein an auxiliary element is brought into contact with a base section on a lower end face of the connecting element when the connecting element is in the release position.

6. The clamping system of claim 5, wherein the auxiliary element includes a screw which is movable toward the lower end face of the connecting element.

7. The clamping system of claim 1, wherein the release unit functions fluidically, wherein a plate, which presses to form a seal against an inner circumferential surface of the depression formed inside the supporting element, is attached on a lower end face of the connecting element, which is opposite to the head of the connecting element, wherein a fluid is selectively introduced into the depression on a side of the plate which is opposite to the connecting element, so that the connecting element is moved in a direction against the pre-tension by the spring into the release position.

8. The clamping system of claim 7, wherein a central fluid duct is formed in the supporting element and has a fluidic connection to an end face of the depression, within which the connecting element is accommodated in a displaceably mounted manner.

9. The clamping system of claim 8, wherein a quick-action coupling is provided on a lateral face of the supporting element and configured to supply a hydraulic fluid from an external fluid source to the central fluid duct.

10. The clamping system of claim 7, wherein said depression is one of a plurality of depressions that are formed in the supporting element, in each of which a connecting element with a head is displaceably accommodated and is pre-tensioned by an associated spring in a direction of the supporting element, and wherein said recess is one of a plurality of recesses provided on or in the cooling unit, each of the plurality of recesses corresponding to one of the plurality of depressions and which are selectively brought into interaction with the head of a respective connecting element.

11. The clamping system of claim 10, wherein a fluid duct leads to each of the plurality of depressions, wherein a central fluid duct provides a fluid to each fluid duct associated with each of the plurality of depressions.

12. A method for attaching and detaching a cooling unit on a circulating supporting element of a caterpillar-type casting machine, wherein the cooling unit is fastened on the supporting element by at least one connecting element, which is pre-tensioned in a direction of a longitudinal axis of the connecting element by a spring, the method comprising:

engaging a head on an upper end face of the connecting element with a recess provided on or in the cooling unit, said engaging step including:

displaceably mounting the connecting element within the supporting element in the direction of the longitudinal axis of the connecting element;

pre-tensioning the connecting element with the spring toward the supporting element such that displacement in the direction of the longitudinal axis of the connecting element defines a clamping position in which the cooling unit, when the head of the connecting element is engaged with the recess provided on or in the cooling unit, is automatically clamped with the supporting element; and wherein said detaching of the cooling unit includes:

providing a fluid under pressure to a lower end face of the connecting element, wherein the connecting element is moved against the spring pre-tension in the direction of the longitudinal axis of the connecting element into a release position, in which clearance results between the head of the connecting element and the recess provided on or in the cooling unit such that the cooing unit is removable from the supporting element.

13. A method for releasing a cooling unit from a circulating supporting element of a caterpillar-type casting machine, wherein the cooing unit is clamped in a starting or clamping position by at least one connecting element, which is pre-tensioned in a direction of a longitudinal axis of the connecting element by a spring, with the supporting element, by a head provided on an upper end face of the connecting element being engaged with a recess provided on or in the cooling unit, the method comprising:

displaceably mounting the at least one connecting element within the supporting element in the direction of the longitudinal axis of the connecting element, providing a fluid under pressure to a lower end face of the connecting element, wherein the connecting element is moved against its spring pre-tension in the direction of the longitudinal axis of the connecting element into a release position, in which clearance results between the head of the connecting element and the recess provided on or in the cooling unit such that the cooing unit is removable from the supporting element.

\* \* \* \* \*